US006392226B1

(12) United States Patent
Takada et al.

(10) Patent No.: US 6,392,226 B1
(45) Date of Patent: May 21, 2002

(54) MASS SPECTROMETER

(75) Inventors: Yasuaki Takada, Kodaira; Takayuki Nabeshima, Kokubunji; Minoru Sakairi, Tokorozawa; Yukiko Hirabayashi, Kokubunji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/254,718

(22) PCT Filed: Sep. 13, 1996

(86) PCT No.: PCT/JP96/02630

§ 371 Date: Mar. 12, 1999

§ 102(e) Date: Mar. 12, 1999

(87) PCT Pub. No.: WO98/11428

PCT Pub. Date: Mar. 19, 1998

(51) Int. Cl.[7] .......................... B01D 59/44; H01J 49/00

(52) U.S. Cl. ...................................................... 250/292

(58) Field of Search ................................ 250/282, 292

(56) References Cited

U.S. PATENT DOCUMENTS 4,540,884 A * 9/1985 Stafford et al. ............. 250/282
4,650,999 A * 3/1987 Fies et al. ................... 250/282
4,686,367 A 8/1987 Louris et al.
5,128,542 A 7/1992 Yates et al.
5,381,007 A * 1/1995 Kelly ......................... 250/282
5,399,857 A * 3/1995 Doroshenko et al. ....... 250/292
5,436,445 A * 7/1995 Kelly ......................... 250/292
5,448,061 A * 9/1995 Wells ......................... 250/282
5,457,315 A * 10/1995 Wells et al. ................ 250/282

FOREIGN PATENT DOCUMENTS

JP 59-127168 U 8/1984

* cited by examiner

*Primary Examiner*—Bruce Anderson
(74) *Attorney, Agent, or Firm*—Antonelli, Terry, Stout & Kraus, LLP

(57) ABSTRACT

Disclosed is a mass spectrometer having an ion trap type mass spectrometric unit, characterized in that in each of ion storage periods, ions created in an ion source (7) are allowed to enter in a space surrounded by a ring electrode (21) and end cap electrodes (22*a* and 22*b*) and are confined in the space, wherein ions are detected with high sensitivities in a wide range of values of m/z (molecular weight of ion/valence number of ion) of the ions by changing the amplitude of a high-frequency voltage applied to the ring electrode (21) in each of the ion storage periods.

5 Claims, 14 Drawing Sheets

CHANGE IN MASS SPECTRUM DEPENDING ON AMPLITUDE OF HIGH - FREQUENCY VOLTAGE IN ION STORAGE PERIOD

RELATIONSHIP BETWEEN AMPLITUDE OF HIGH - FREQUENCY VOLTAGE IN ION STORAGE PERIOD AND IONIC STRENGTH

MASS SPECTROMETER

TECHNICAL FIELD

The present invention relates to a mass spectrometer, and particularly to a liquid chromatograph/mass spectrometer in which a liquid chromatograph is coupled with an ion trap type mass spectrometer.

BACKGROUND ART

Recently, in the field of analysis, it is required to establish a technique of analyzing a mixture. For example, in the case of analyzing harmful substances in environments, a sample taken for analysis (for example, water in lakes and marshes) contains a variety of substances. The same is true for analysis of substances associated with organisms. A sample derived from an organism, such as blood or urine, contains a variety of substances. In this way, the technique of analyzing a mixture is essential to analysis of substances associated with environments and substances associated with organisms.

In general, it is difficult to directly analyze a mixture. Accordingly, a mixture is separated into components, each of which is in turn detected and identified. In such circumstances, a liquid chromatograph/mass spectrometer (hereinafter, referred to as "LC/MS") and a capillary electrophoresis/mass spectrometer (hereinafter, referred to as "CE/MS") in which a liquid chromatograph and a capillary electrophoresis good in separation are respectively coupled with a mass spectrometer good in identification of a substance are very useful for analysis of the above-described substances associated with environments and organisms.

A prior art LC/MS using a mass spectrometer having an ion trap type mass spectrometric unit will be described with reference to FIG. 14.

A liquid chromatograph 1 includes a liquid supply pump 2, a mobile phase solvent bath 3, a sample injector 4, a separation column 5, and a pipe 6. The mobile phase solvent is supplied at a specific flow rate from the liquid supply pump 2 to the separation column 5. A mixture sample is introduced from the sample injector 4 disposed between the liquid supply pump 2 and the separation column 5. The sample, which has reached the separation column 5, is separated into components by interaction with a filler charged in the separation column 5. The sample, whose components have been separated by the liquid chromatograph 1, is introduced together with the mobile phase solvent into an ion source 7.

Of known various type of ion sources, a typical electrostatic spraying type will be described below. The sample, which has reached the ion source 7, is introduced in a metal tube 9*a* via a connector 8. When a high voltage of several kilovolts is applied from a high voltage power supply 11 between the metal tube 9*a* and an electrode 10 disposed opposite to the metal tube 9*a*, electrostatic spray is generated in the direction of the counter electrode 10 from the end of the metal tube 9*a*. The flow rate of a solution allowing to sustain stable electrostatic spraying is about several microliters per minute; however, the flow rate of the solution supplied from the liquid chromatograph 1 to the ion source 7 is about one milliliter per minute, and accordingly, a spraying gas 13 supplied from a gas supply pipe 12 is allowed to flow around the metal tube 9*a* to assist electrostatic spraying with the gas 13. Droplets created by electrostatic spraying, which contain ions associated with sample molecules, are dried into gaseous ions. The ions thus created are introduced in a vacuum unit 17 pumped by a pumping system 15*b* via an ion introducing pore 14*a* opened in the counter electrode 10, a differential pumping portion 16 pumped by a pumping system 15*a*, and an ion introducing pore 14*b*. An electrostatic lens 19*a* composed of electrodes 18*a* and 18*b* is disposed in the differential pumping portion 16, which lens acts to converge ions for improving the permeability of the ions through the pore 14*b*. The ions introduced in the vacuum unit 17 are converged through a converging lens 19*b* composed of electrodes 18*c*, 18*d* and 18*e*, and then introduced in an ion trap mass spectrometric unit 20.

Next, the operational principle of the ion trap mass spectrometric unit will be described. The ion trap mass spectrometric unit 20 includes a ring electrode 21 and end cap electrodes 22*a* and 22*b*. FIG. 15 is a diagram showing a control of the amplitude of a high-frequency voltage applied to the ring electrode with an elapsed time in a period of time required for obtaining a first mass spectrum (the change in voltage applied to an electrode with an elapsed time, as shown in the figure, is hereinafter referred to as "scan function"). First, in an ion storage period. 201, a high-frequency voltage is applied to the ring electrode 21 to form a potential for confinement of ions in a space surrounded by the ring electrode 21 and end caps electrodes 22*a* and 22*b*. The ions trapped in the vacuum unit 17 are converged through the converging lens 19*b* to enter into the space surrounded by the ring electrode 21 and the end cap electrodes 22*a* and 22*b* from an opening 23*a* formed in the end cap electrode 22*a*. An impingement gas such as helium is introduced in the space surrounded by the ring electrode 21 and the end cap electrodes 22*a* and 22*b*, and is kept at a pressure of about 1 milli-Torr. The ions impinge on molecules of the impingement gas to lose the energies thereof, and are confined in the confinement potential formed in the space surrounded by the ring electrode 21 and the end cap electrodes 22*a* and 22*b*. Next, in a scan period 202, a voltage applied to either of the electrodes 18*c*, 18*d* and 18*e* constituting the converging lens 19*b* is changed, to prohibit the ions from passing through the converging lens 19*b*, thereby preventing entrance of the ions into the ion trap mass spectrometric unit 20. The mass analysis is performed by gradually increasing the amplitude of the high-frequency voltage applied to the ring electrode 21. It is known from a document "Practical Aspects of Ion Trap Mass Spectrometry, vol. 2, p. 10(CRC Press, 1995)" that in the ion trap mass spectrometric unit, the ion trajectory becomes unstable in the direction of the end cap electrode (the direction of the Zo axis shown in FIG. 14) if a q value defined in the following equation is more than 0.908.

$$q=8zV/m(r_o^2+2Z_o^2)\Omega^2 \quad \text{(Equation 1)}$$

In this equation, z designates the electric charge of an ion; V is the amplitude of a high-frequency voltage applied to the ring electrode; m is the mass of the ion; $r_0$ and $Z_0$ are a radius of the circle inscribed with the ring electrode 21 and the distance from the center of the circle to each of the end cap electrodes 22*a* and 22*b* respectively; and Ω is an angular frequency of the high-frequency voltage applied to the ring electrode 21. Accordingly, in the scan period 202, as the amplitude V of the high-frequency voltage applied to the ring electrode 21 is gradually increased, the trajectories of the ions become unstable sequentially in the order from an ion having a smaller value obtained by dividing the mass of the ion by the electric charge of the ion (hereinafter, referred to as "m/z") to an ion having a larger value of m/z, and the ions are sequentially discharged from openings 23*a* and 23*b* formed in the end cap electrodes 22a and 22b to the outside of the mass spectrometric unit 20. The discharged ions are detected by an ion detector 24, and detection signals are supplied to a data processor 26 via a signal line 25, to be thus processed. After termination of the scan period 202, the voltage applied to the ring electrode 21 is cut off, to destroy the ion confinement potential, thereby removing the ions remaining in the mass spectrometric unit 20 (ion removing period 203). These sequences of operations (ion storage period 201, scan period 202, and remaining ion removing period 203) are repeated, to perform mass analysis of the samples sequentially supplied from the liquid chromatograph 1.

While not shown in FIG. 14, the liquid chromatograph 1, ion source 7, electrostatic lenses 19a and 19b, and ion trap mass spectrometric unit 20 are controlled by a control unit (including a controlling power supply, control circuit, and control software).

The above-described prior art is disclosed in a document "Analytical Chemistry, vol. 63, p. 375, 1991", and the operational principle of the ion trap mass/spectrometric unit is disclosed in U.S. Pat. No. 4,540,884.

DISCLOSURE OF INVENTION

The above-described prior art has the following problems:

In the ion storage period 201, a high-frequency voltage having a specific amplitude is applied to the ring electrode 21, and accordingly, as is apparent from Equation 1, the q values of ions having different values of m/z are different from each other. It is known that when ions created in a source outside the ion trap mass spectrometric unit 20 are allowed to enter in the mass spectrometric unit 20, the confinement efficiency of the ions from the outside in the ion trap mass spectrometric unit 20 is dependent on the q values of the ions. In accordance with the description in a document "Practical Aspects of Ion Trap Mass Spectrometry, vol. 2, p. 75 (CRC Press, 1995)", an ion having a q value ranging from about 0.4 to 0.5 can be efficiently confined in the ion trap mass spectrometric unit 20; however, the confinement efficiency of an ion having a q value out of the above range is poor. In the mass spectrometer having an ion trap mass spectrometric unit 20, since ions confined in the mass spectrometric unit in the ion storage period 201 are discharged outside the mass spectrometric unit 20 in the scan period 202 to be detected, there is a close relationship between the confinement efficiency of the ions and the detection sensitivity of the ions. As a result, in the LC/MS having the prior art ion trap mass spectrometric unit, ions different in the q value (that is, different in m/z) are different in confinement efficiency in the ion trap mass spectrometric unit 20, they become different in detection sensitivity. In other words, if the q value is optimized (as is apparent from Equation 1, this means that the amplitude of a high-frequency voltage in the ion storage period 201 is optimized) for an ion having a certain value of m/z, there arises a problem that the above ion is efficiently confined in the ion trap mass spectrometric unit 20 and thereby it can be detected with a high sensitivity; however, another ion having a value of m/z different from the above one corresponding to the optimized q value is not efficiently confined in the ion trap mass spectrometric unit 20 and thereby it cannot be detected with a high sensitivity.

FIG. 16 shows a change in mass spectrum depending on the amplitude of a high-frequency voltage in the ion storage period 201, in a test using a mass spectrometer having the prior art ion trap mass spectrometric unit. In this test, the sample was prepared by dissolving two kinds of polyethylene glycol (structural formula: HO—$(CH_2—CH_2—O)_n$—H) having average molecular weights of 200 and 600 in water at each concentration of 10 μmol/l. When the amplitude of the high-frequency voltage upon ion storage was set at 150 V, the cluster ion ($H_3O^+(H_2O)$, m/z=37) of protonated water used for a solvent was strongly observed; however, in a range of relatively large values of m/z (m/z>300), ions were little observed. On the other hand, when the amplitude was set at 460 V, the intensity of the cluster ion (m/z=37) of water became lower, and even in a range of m/z>500, ions of protonated molecules of polyethylene glycol were observed with high sensitivities. FIG. 17 is a graph showing the result of examining the relationship between the amplitude of the high-frequency voltage in the ion storage period 201 and the ion intensity, using typical values selected from the peaks of the above data of polyethylene glycol shown in FIG. 16. The ion (m/z=195) was most strongly observed at the amplitude of 400 V; however, at this amplitude, the intensity of the ion (m/z=723) was weak. On the other hand, the intensity of the ion (m/z=723) was most strongly observed at the amplitude of 585 V; however, at this amplitude, the intensity of the ion (m/z=195) was reduce to about half the maximum value. In this way, if the amplitude of the high-frequency voltage in the ion storage period 201 is kept constant, the range of the values of m/z of ions detectable with high sensitivities is narrow, thereby making it difficult to analyze ions in a wide range of values of m/z with high sensitivities.

If a substance to be analyzed is known, the values of m/z of ions derived from the substance can be estimated, and accordingly, the amplitude of a high-frequency voltage in the ion storage period 201 can be previously set at a value allowing the ions to be detected with high sensitivities. In the case where the values of m/z of ions cannot be estimated, however, the amplitude must be roughly set, so that the ions of the sample cannot be necessarily detected with high sensitivities. This causes a large problem particularly in the case of automatic analysis of an unknown sample, significantly degrading the reliability of the mass spectrometer.

In view of the foregoing, it has been expected to develop a mass spectrometer capable of detecting ions in a wide range of values of m/z at high sensitivities.

An object of the present invention is to provide a mass spectrometer having an ion trap type mass spectrometric unit capable of obtaining a mass spectrum in a wide range of values of m/z of ions, while not giving any laborious work to an operator in setting the amplitude of a high-frequency voltage in an ion storage period, by superimposing a plurality of mass spectra obtained under different ion storage conditions (different amplitudes of the high-frequency voltage applied to a ring electrode in the ion storage periods) and outputting the superimposed spectra as one mass spectrum.

The above object can be achieved, according to the present invention, by provision of a mass spectrometer including: an ion source for ionizing a sample; an ion introducing pore for trapping ions created in the ion source into a vacuum unit; and an ion trap mass spectrometric unit disposed in the vacuum unit; wherein the inside of the ion trap mass spectrometric unit has the setting of ion storage periods in each of which the ions are stored in the ion trap mass spectrometric unit, and mass scan periods in each of which the ions stored in the ion trap mass spectrometric unit are discharged outside the ion trap mass spectrometric unit depending on values of the ions, each value being obtained by dividing the molecular weight of the ion by the valence number of the ion and the mass spectrum of the ions thus discharged are detected; the mass spectrometer being characterized in that the amplitude of a high-frequency voltage applied to a ring electrode constituting part of the ion trap mass spectrometric unit in each of the ion storage periods is set at different values before and after an arbitrary one of the mass scan periods. The above object can be also achieved by provision of mass spectrometer including: an ion source for ionizing a sample; an ion introducing pore for trapping ions created in the ion source into a vacuum unit; and an ion trap mass spectrometric unit disposed in the vacuum unit; wherein the inside of the ion trap mass spectrometric unit has the setting of ion storage periods in each of which the ions are stored in the ion trap mass spectrometric unit, and mass scan periods in each of which the ions stored in the ion trap mass spectrometric unit are discharged outside the ion trap mass spectrometric unit depending on values of the ions, each value being obtained by dividing the molecular weight of the ion by the valence number of the ion and the mass spectrum of the ions thus discharged are detected; the mass spectrometer being characterized in that the amplitude of a high-frequency voltage applied to a ring electrode constituting part of the ion trap mass spectrometric unit in each of the ion storage periods is changed within each of the ion storage periods. The above object can be also achieved by provision of a mass spectrometer including: an ion source for ionizing a sample; an ion introducing pore for trapping ions created in the ion source into a vacuum unit; and an ion trap mass spectrometric unit disposed in the vacuum unit; wherein the inside of the ion trap mass spectrometric unit has the setting of ion storage periods in each of which the ions are stored in the ion trap mass spectrometric unit, and mass scan periods in each of which the ions stored in the ion trap mass spectrometric unit are discharged outside the ion trap mass spectrometric unit depending on values of the ions, each value being obtained by dividing the molecular weight of the ion by the valence number of the ion and the mass spectrum of the ions thus discharged are detected; the mass spectrometer being characterized in that the amplitude of a high-frequency voltage applied to a ring electrode constituting part of the ion trap mass spectrometric unit in each of the ion storage periods is set on the basis of information obtained by a mass spectrum which has been previously obtained at an arbitrarily set amplitude. The above object can be also achieved by provision of a mass spectrometer including: an ion source for ionizing a sample; an ion introducing pore for trapping ions created in the ion source into a vacuum unit; and an ion trap mass spectrometric unit disposed in the vacuum unit; wherein the inside of the ion trap mass spectrometric unit has the setting of ion storage periods in each of which the ions are stored in the ion trap mass spectrometric unit, and mass scan periods in each of which the ions stored in the ion trap mass spectrometric unit are discharged outside the ion trap mass spectrometric unit depending on values of the ions, each value being obtained by dividing the molecular weight of the ion by the valence number of the ion and the mass spectrum of the ions thus discharged are detected; the mass spectrometer being characterized in that portions, equivalent to arbitrary values of m/z (molecular weight of ion/valence number of ion), of a plurality of mass spectra obtained by changing the amplitude of a high-frequency voltage applied to a ring electrode constituting part of the ion trap mass spectrometric unit in each of the ion storage periods are coupled with each other, and are outputted as one mass spectrum. The above object can be also achieved by provision of a mass spectrometer including: an ion source for ionizing a sample; an ion introducing pore for trapping ions created in the ion source into a vacuum unit; and an ion trap mass spectrometric unit disposed in the vacuum unit; wherein the inside of the ion trap mass spectrometric unit has the setting of ion storage periods in each of which the ions are stored in the ion trap mass spectrometric unit, and mass scan periods in each of which the ions stored in the ion trap mass spectrometric unit are discharged outside the ion trap mass spectrometric unit depending on values of the ions, each value being obtained by dividing the molecular weight of the ion by the valence number of the ion and the mass spectrum of the ions thus discharged are detected; the mass spectrometer being characterized in that the amplitude of a high-frequency voltage applied to a ring electrode constituting part of the ion trap mass spectrometric unit in each of the ion storage periods is set depending on a substance to be analyzed.

BEST MODE FOR CARRYING OUT THE INVENTION

Hereinafter, embodiments of the present invention will be described in detail with reference to the drawings.

Figure 1:
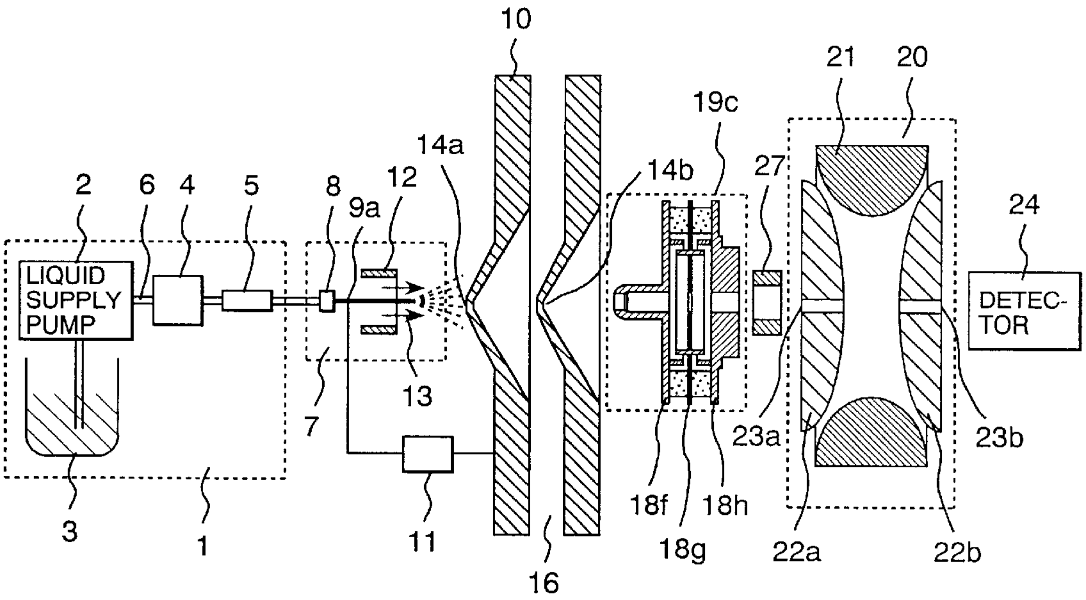
FIG. 1 is a view showing the configuration of one embodiment of a liquid chromatograph/mass spectrometer having an ion trap mass spectrometric unit according to the present invention.
Figure 2:
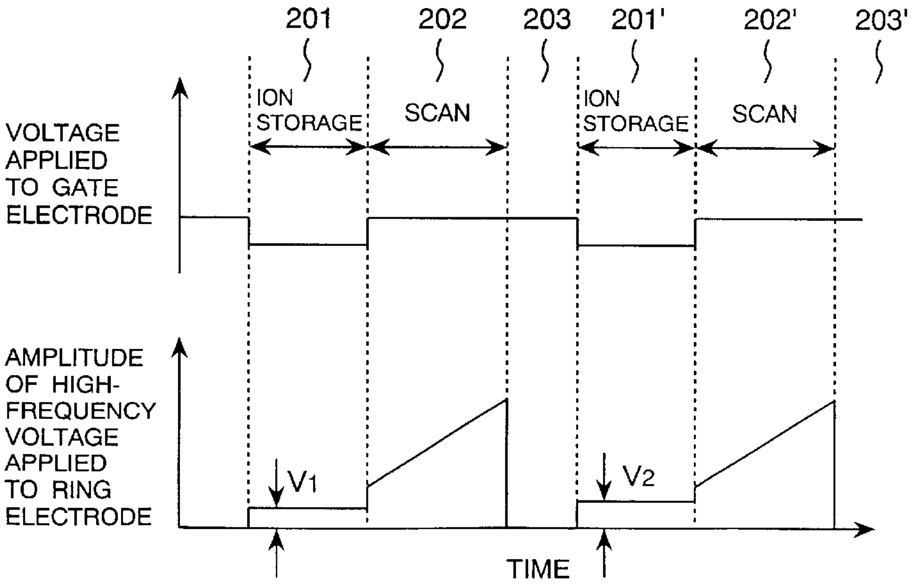
FIG. 2 is a diagram showing a scan function in one embodiment of the present invention.

FIG. 1 is a view illustrating one embodiment of the present invention. Ions created in an external ion source 7 which is, for example, of an electrostatic spraying type are introduced in a vacuum unit via ion introducing pores 14*a* and 14*b*. The ions introduced in the vacuum unit are converged through a converging lens 19*c* and then introduced in an ion trap mass spectrometric unit 20. A scan function is shown in FIG. 2. In an ion storage period 201, a high-frequency voltage is applied to an end cap electrode 21 to form a potential for confinement of the ions in a space surrounded by the ring electrode 21 and end cap electrodes 22*a* and 22*b*. A gate electrode 27 is provided for control of the entrance of ions into the ion trap mass spectrometric unit 20. In the ion storage period 201, a voltage applied to the gate electrode 27 is set to allow the ions to pass through the gate electrode 27. FIG. 2 shows an example in which a positive ion is analyzed. That is to say, in the ion storage period 201, the voltage applied to the gate electrode 27 is lowered to allow the ions to pass through the gate electrode 27. A gas such as helium is introduced in the space surrounded by the ring electrode 21 and the end cap electrodes 22*a* and 22*b* and is kept at a pressure of about 1 milli-Torr. The ions impinge on molecules of the gas in the space surrounded by the ring electrode 21 and the end cap electrodes 22*a* and 22*b* to lose energies thereof, to be thus confined by the confinement potential. Next, in a scan period 202, the voltage applied to the gate electrode 27 is changed to prohibit the next ions from passing through the gate electrode 27, thereby preventing the next ions from flowing into the mass spectrometric unit 20 until the next ion storage period 201'. In the scan period 202, by gradually increasing the amplitude of the high-frequency voltage applied to the ring electrode 21, the ions are discharged from openings 23*a* and 23*b* formed in the end cap electrodes 22*a* and 22*b* sequentially in the order from an ion having a smaller value of m/z to an ion having a larger value of m/z. The ions thus discharged are detected by an ion detector 24, and the detection signals are supplied to a data processor, to be thus processed. After termination of the scan period 202, the voltage applied to the ring electrode 21 is cut off, to remove the remaining ions in the mass spectrometric unit 20 (ion removing period 203).

In these sequences of operations, there is the amplitude of the high-frequency voltage applied to the ring electrode 21 in each ion storage period (201, 201', and while not shown, an arbitrary ion storage period in patterns, each pattern having the ion storage period, scan period and ion removing period, repeated with elapsed time). For simplicity, there will be described an example in which the amplitude of the high-frequency voltage upon ion storage is changed into two values ($V_1$, $V_2$). Assuming that the amplitudes of the high-frequency voltage in the first and second ion storage periods 201 and 201' are taken as $V_1$ and $V_2$ respectively, and the values $V_1$ and $V_2$ satisfy the relationship of $V_2>V_1$, the mass spectrum obtained in the second scan period 202' is made lower in sensitivity for ions having small values of m/z and is made higher in sensitivity for ions having large values of m/z as compared with the mass spectrum obtained in the first scan period 202. Thereupon, the mass spectra obtained in these two scan periods 202 and 202' are superimposed to each other (for example, by totalizing or equalizing the mass spectra), and are represented as one mass spectrum (displayed as one mass spectrum on the screen of a monitor of the data processor or printed as one spectrum using a printer), to thereby detect the ions in a wide range of values of m/z.

Assuming that a time required for ion storage is taken as 0.1 sec and a time required for scan is taken as 0.1 sec, it takes about 0.2 sec to obtain one mass spectrum. In the above example, it takes about 0.4 sec to totalize or equalize the two mass spectra. In the LC/MS, however, it takes generally about 1 min from the start of elution of a sample from the column to the end of the elution. Accordingly, even if some mass spectra are totalized or equalized, there is no problem from the viewpoint of practical use because one process data can be obtained once every several seconds.

Although the amplitude of the high-frequency voltage in the ion storage periods is changed into two values in the sample shown in FIG. 2, it may be more finely changed. For example, in the case of analyzing a sample containing amino acid having a molecular weight of about 100, peptide having a molecular weight ranging from several hundreds to several thousands, and protein having a molecular weight ranging from several tens of thousands or several hundreds of thousands, the amplitude of a high-frequency voltage in ion storage periods may be changed into three or more of different values. That is to say, the mixture containing samples largely different in molecular weight can be analyzed by superimposing a plurality of mass spectra obtained at the different amplitudes to each other and representing them as one mass spectrum.

Figure 3:
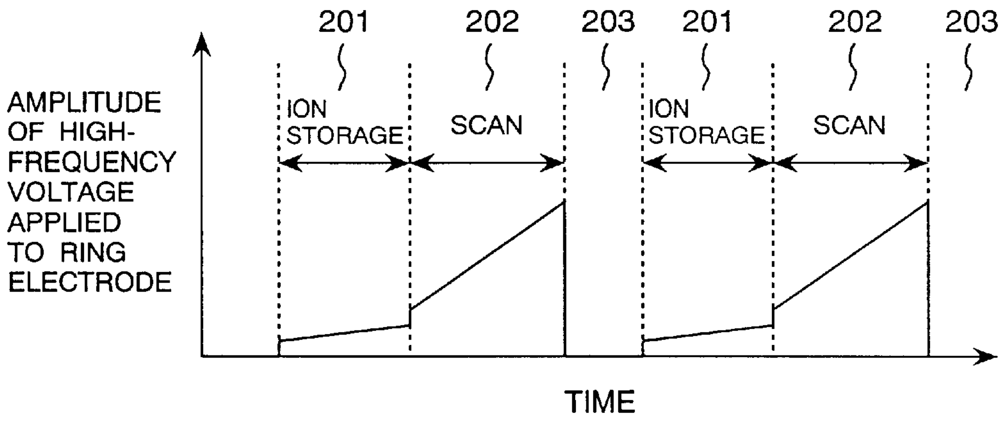
FIG. 3 is a diagram showing a scan function in one embodiment of the present invention.

FIG. 3 shows a scan function according to another embodiment of the present invention. If there is no sufficient time to totalize or equalize mass spectra obtained in a plurality of scan periods, for example, because a sample is supplied to an ion source for a short period of time, it is required to obtain a mass spectrum in a wide range of values of m/z only in one scan period. In this case, the amplitude of the high-frequency voltage in the single ion storage period 201 may be changed. By gradually changing the amplitude in the ion storage period 201 as shown in FIG. 3, an ion having a smaller value of m/z and an ion having a larger value of m/z are relatively efficiently stored in the ion trap mass spectrometric unit at a timing with a smaller amplitude and a timing with a larger amplitude, respectively. As a result, ions can be detected in a wide range of values of m/z, without carrying out the step of superimposing a plurality of mass spectra to each other and representing them as one mass spectrum.

Figure 4:
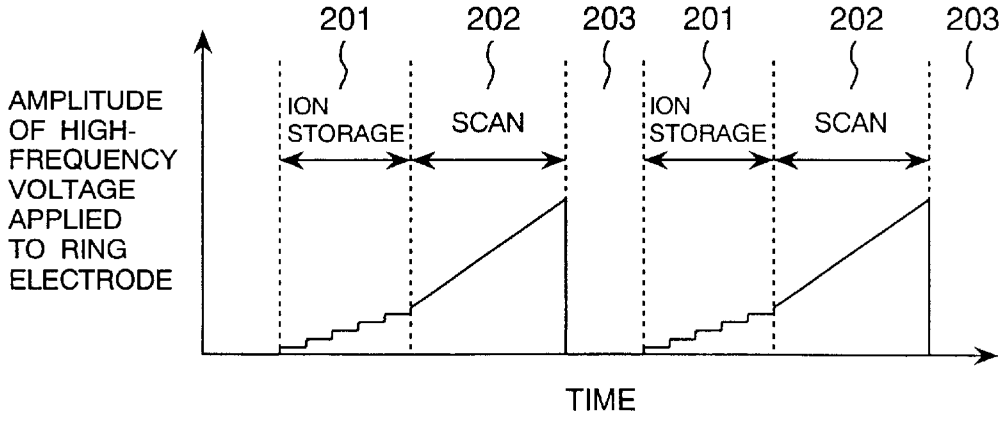
FIG. 4 is a diagram showing a scan function in one embodiment of the present invention.

FIG. 4 shows a modification of the method, shown in FIG. 3, of changing the amplitude of the high-frequency voltage in the single ion storage period 201. As shown in FIG. 4, the amplitude may be stepwise changed in the ion storage period 201. Like the method of gradually changing the amplitude shown in FIG. 3, an ion having a smaller value of m/z and an ion having a larger value of m/z are efficiently stored in the ion trap mass spectrometric unit at a timing with a smaller amplitude and a timing with a larger amplitude respectively, with a result that ions can be detected in a wide range of values of m/z.

The methods described with reference to FIGS. 1 to 4 realize a mass spectrometer having an ion trap mass spectrometric unit capable of obtaining a mass spectrum of ions in a wide range of values of m/z. This is particularly effective for the LC/MS for analyzing a mixture, that is, ions having various values of m/z.

Figure 5:
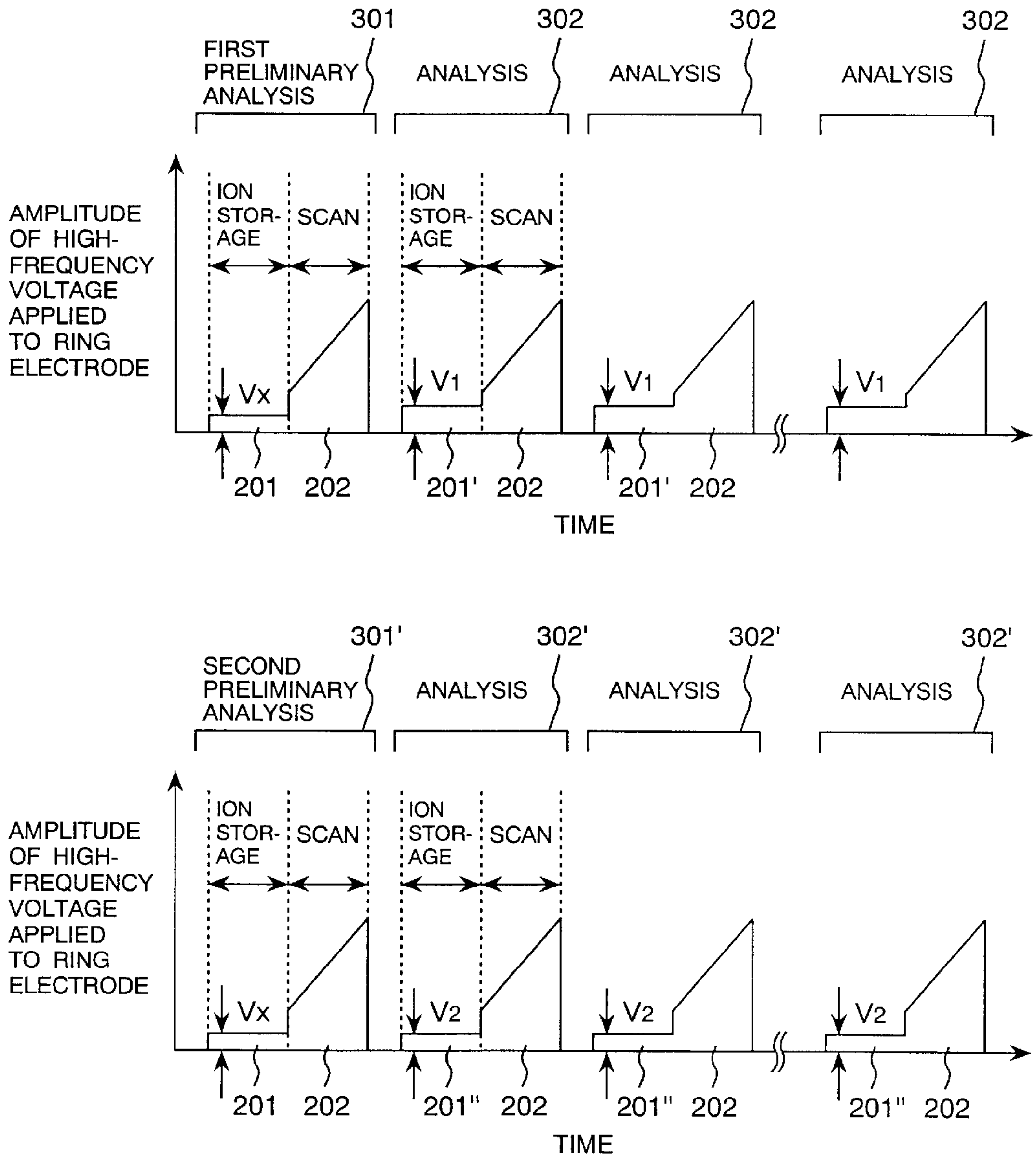
FIG. 5 is a diagram showing a scan function in one embodiment of the present invention.

FIG. 5 is a diagram showing a further embodiment of the present invention. The embodiments described with reference to FIGS. 1 to 4 are very simple and useful for achieving the object of the present invention, that is, for achieving detection of ions in a wide range of values of m/z; however, these embodiments have another problem in slightly reducing the detection sensitivity. This problem will be described using the example shown in FIG. 2. In this example, from the viewpoint of analysis of an ion having a specific value of m/z, the mass spectrum obtained in a good ion confinement condition and the mass spectrum obtained in a poor ion confinement condition are totalized or equalized, with a result that the detection sensitivity becomes slightly poor as compared with the analysis performed in the ion confinement condition optimized to the ion having the specific value of m/z. A method of solving such a problem will be described below. For the first time, relationships between values of m/z of ions and amplitudes of the high-frequency voltage in the ion storage period capable of efficiently confining the ions in the ion trap mass spectrometric unit are previously examined and listed in a control unit or the like. Incidentally, in the case of analysis of an unknown sample, since values of m/z of ions derived from the sample are unknown, the amplitude of the high-frequency voltage in the ion storage period 201 is set at an arbitrary value ($V_x$), and a preliminary analysis 301 is performed for the ions derived from the sample. The values of m/z of the ions obtained at that time can be found by examining the mass spectrum obtained by the preliminary analysis 301. Then, by comparing the values of m/z thus found with the listed relationships between the values of m/z and the amplitudes, an amplitude ($V_1$) of the high-frequency voltage in the ion storage period capable of efficiently confining the associated ions in the ion trap mass spectrometric unit can be automatically determined. After that, the ions are stored (201') at the amplitude ($V_1$) determined on the basis of the information obtained by the preliminary analysis 301 and are analyzed (302). With this method, even if ions derived from a sample have any values of m/z, it is possible to analyze the ions with high sensitivities while not giving any laborious work to an operator in setting the amplitude. In this embodiment, although the control of the mass spectrometer is complicated, analysis of ions can be performed with high sensitivities in a wide range of values of m/z.

In a system in which the mixture separating means is coupled with the mass spectrometer, for example, in the LC/MS, the kinds of samples supplied from the ion source become different with elapsed time, so that the values of m/z of ions created from the samples necessarily vary with elapsed time. As a result, even if the amplitude of the high-frequency voltage in the ion storage period is determined by the preliminary analysis at the beginning of the analysis procedure, after an elapse of a certain time, there is a possibility that the amplitude is out of the optimum condition because a different sample is introduced in the ion source. Accordingly, it is important that after an elapse of a certain time, a preliminary analysis 301' is performed again to determine the amplitude again in accordance with the values of m/z of the ions obtained at that time. That is to say, as shown in FIG. 5, the analysis is performed for a while using the amplitude $V_1$ determined by the first preliminary analysis 301 and then the second preliminary analysis 301' is performed. If the values of m/z of ions observed by the second preliminary analysis 301' are different from those of the ions obtained by the first preliminary analysis 301, the amplitude of an ion storage period 201" is reset at a value allowing the ions observed by the second preliminary analysis to be efficiently stored in the ion trap, that is, $V_2$, and the following analysis is performed at the amplitude $V_2$ (302'). In this way, it is possible to analyze ions created in the ion source with high sensitivities even if the values of m/z of the ions are changed with elapsed time by repeating the preliminary analyses at intervals, and correcting the amplitude of the high-frequency voltage applied to the ring electrode in the ion storage period into a value allowing the ions observed in each preliminary analysis to be efficiently confined in the ion trap.

In the case of the LC/MS, since it often takes about one minute from the start of elution of one sample from the separation column to the end of the elution, the reset of the amplitude on the basis of the preliminary analysis may be performed once every several seconds. Meanwhile, in the case of the CE/MS, since it often takes several seconds to detect one sample, the reset of the amplitude based on the preliminary analysis must be performed once or several times every one second. The duration in which one sample is continuously detected varies depending on the separating condition. For example, in the liquid chromatograph, the duration in which one sample is continuously detected varies even depending on the composition and flow rate of the mobile phase solvent. Accordingly, the frequency of preliminary analyses may be set in consideration of the separating manner or separating condition.

Figure 6:
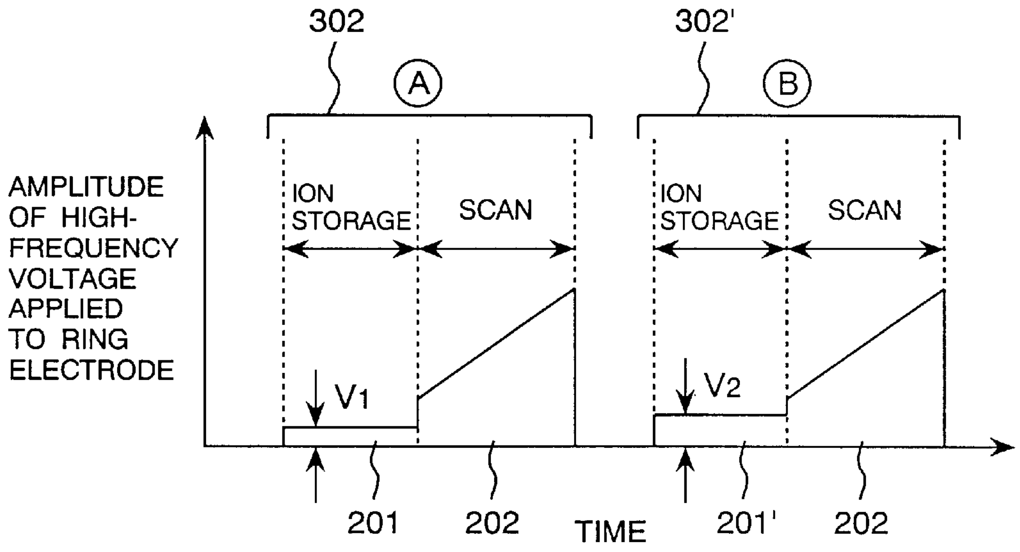
FIG. 6 is a diagram showing a scan function in one embodiment of the present invention.
Figure 7:
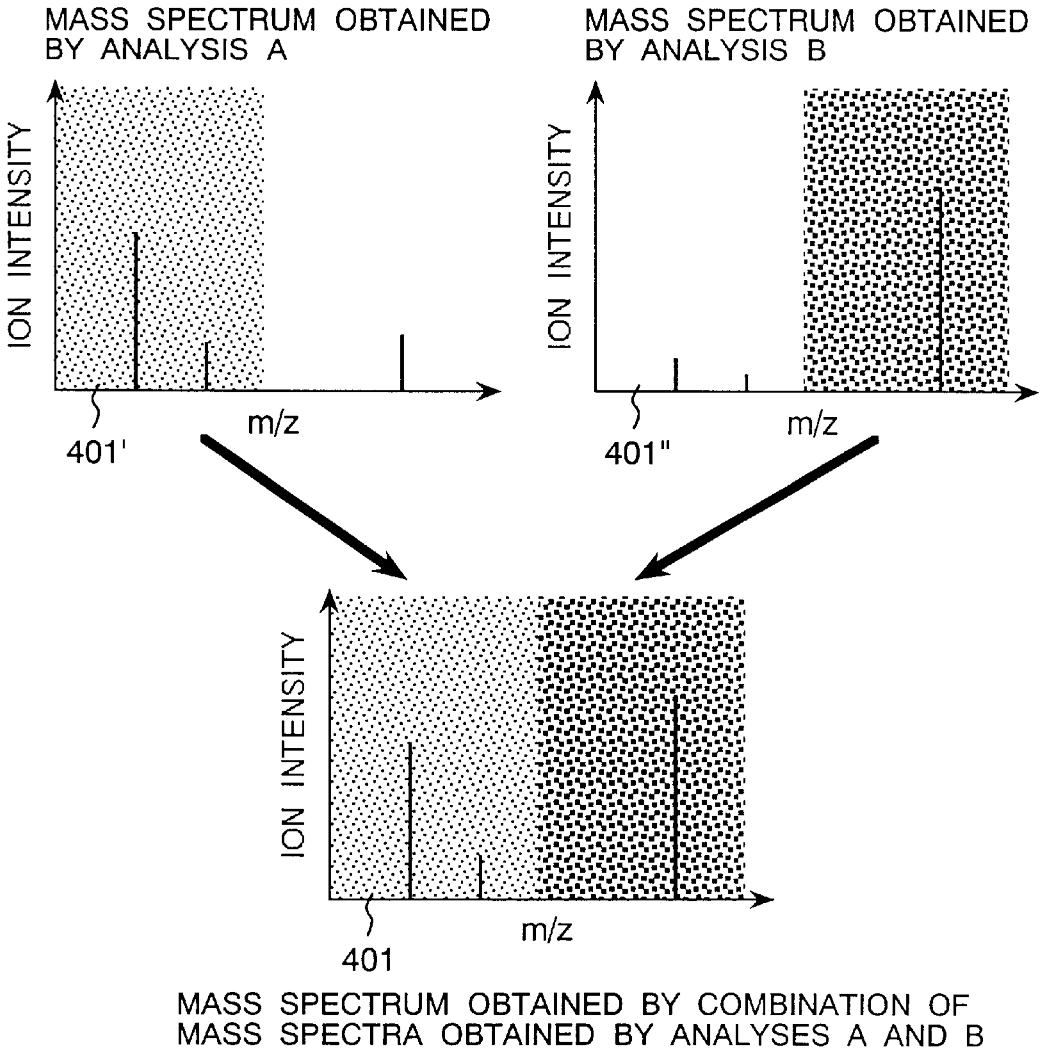
FIG. 7 is a diagram showing a method of obtaining a plurality of mass spectra, combining portions, detected with high sensitivities, of the mass spectra with each other, and representing the combined portions of the plurality of mass spectra as one mass spectrum according to one embodiment of the present invention.

FIG. 6 is a diagram showing a further embodiment of the present invention. If there is a sufficient time for analysis, for example, if a sample solution is continuously introduced in an ion source without use of any separating means, or if even in the case of using the liquid chromatograph, a sample is introduced in an ion source for a long time because of a small flow rate of the mobile phase, the analysis may be performed as follows. First, like the embodiment shown in FIG. 2, in the ion storage periods 201 and 201', the mass spectra are obtained by changing the amplitude of the high-frequency voltage applied to the ring electrode upon ion storage. Upon output of the results, as shown in FIG. 7, portions, equivalent to the ranges of the values of m/z allowing analysis with good sensitivities, of the mass spectra obtained by the analyses 302 and 302' are combined with each other and are represented as one mass spectrum. For example, in one mass spectrum 401 outputted as the analytical result, the portion equivalent to the range of the small values of m/z represents a spectrum 401' (302 in FIG. 6) analyzed at the small amplitude of the high-frequency voltage in the ion storage period and the portion equivalent to the range of the large values of m/z represents a spectrum 401" (302' in FIG. 6) analyzed at the large amplitude of the high-frequency voltage. In this way, it is possible to obtain a mass spectrum in a wide range of values of m/z and also to perform the analysis at higher sensitivities as compared with the embodiment shown in FIG. 2 because the mass spectra are not equalized.

Figure 8:
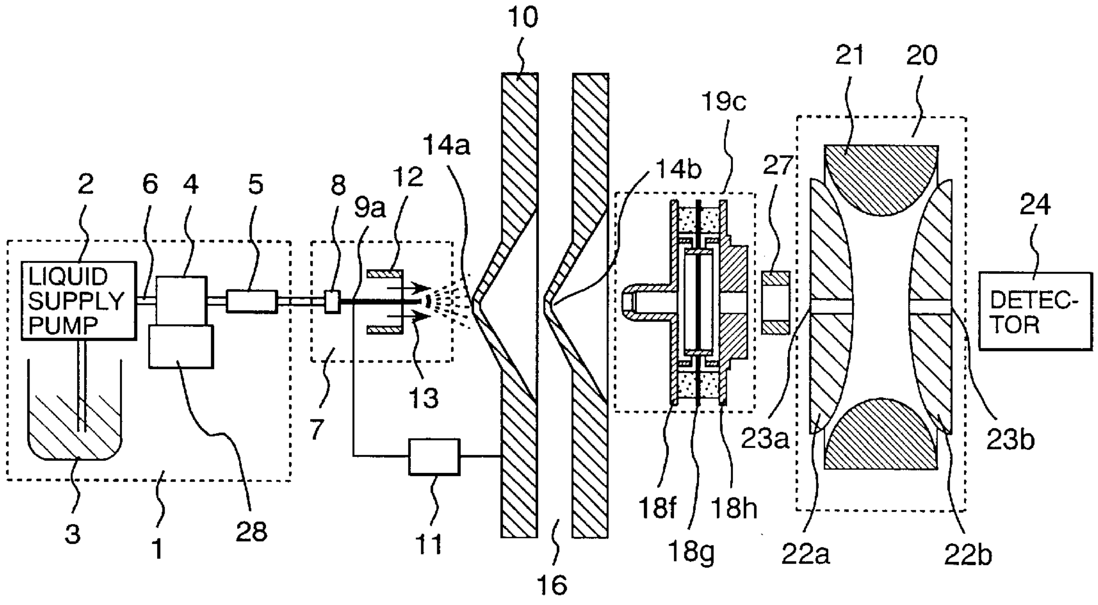
FIG. 8 is a view showing the configuration of a liquid chromatograph/mass spectrometer allowing automatic analysis according to one embodiment of the present invention.

The embodiments shown in FIGS. 1 to 7 are particularly effective for automatic analysis of an unknown sample. As shown in FIG. 8, the automatic analysis is realized by connecting an automatic sample injecting device 28 to the sample injector 4 of the LC/MS. In the case of using the automatic sample injecting device, it is desirable to simultaneously control the liquid chromatograph, automatic sample injecting device, and mass spectrometer via a control circuit (not shown). This makes it possible to synchronize the injection of a sample with the analysis starting time of the mass spectrometer.

Figure 9:
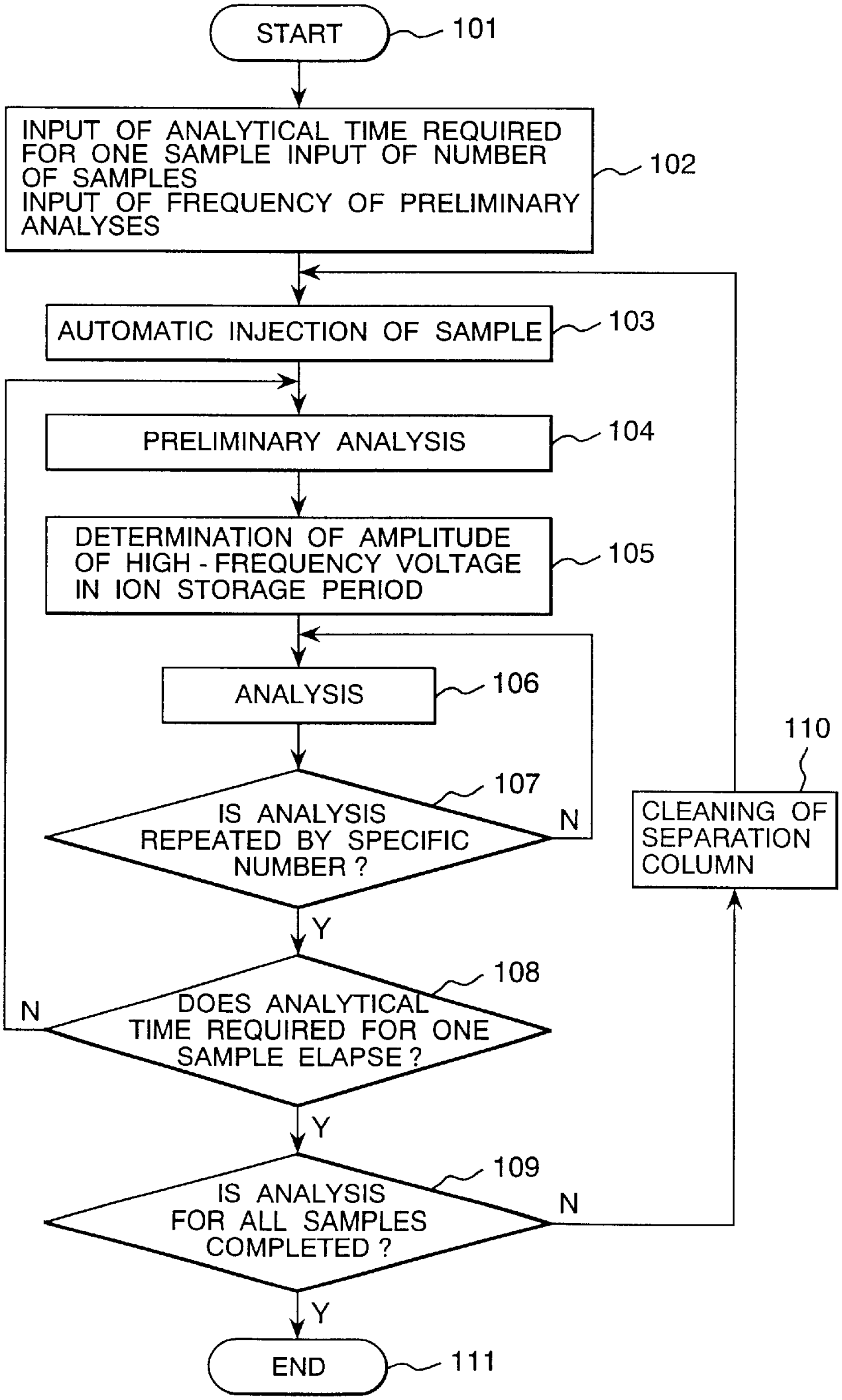
FIG. 9 is a flow chart showing steps of automatic analysis of an unknown sample according to one embodiment of the present invention.

FIG. 9 is a flow chart showing the flow of treatment in automatic analysis using the method of setting the amplitude of a high-frequency voltage applied to the ring electrode upon ion storage on the basis of the preliminary analysis. First, the number of samples, a time required for analysis of one sample (in the case of the LC/MS, it often takes about one hour) and the frequency of preliminary analyses are inputted (102). The frequency of preliminary analyses may be set in terms of the number of main analyses repeated between two adjacent preliminary analyses, or in terms of the time (in minute or second) required for main analyses repeated between two adjacent preliminary analyses. Next, a sample is automatically injected (103). Since the values of m/z of the ions observed in a preliminary analysis (104) are found by examining the mass spectrum obtained by the preliminary analysis (104), the amplitude of the high-frequency voltage upon ion storage capable of efficiently confining the associated ions in the ion trap mass spectrometric unit is determined (105). Then, analysis (106) is performed at the amplitude determined on the basis of the information obtained by the preliminary analysis, to obtain data of the ions. After the analysis is repeated (107) by a specific. number (or for a specific time), if the elapsed time is within the above time required for analysis of one sample (108), the preliminary analysis is performed again (104) to correct the setting of the amplitude. If a portion of the sample not used for analysis remains (109) after an elapse of the above time required for analysis of one sample, the separation column is cleaned (110) and the next sample is injected to be analyzed. With this treatment shown in FIG. 9, even the ions of an unknown sample can be automatically analyzed with high sensitivities in a wide range of values of m/z.

Figure 10:
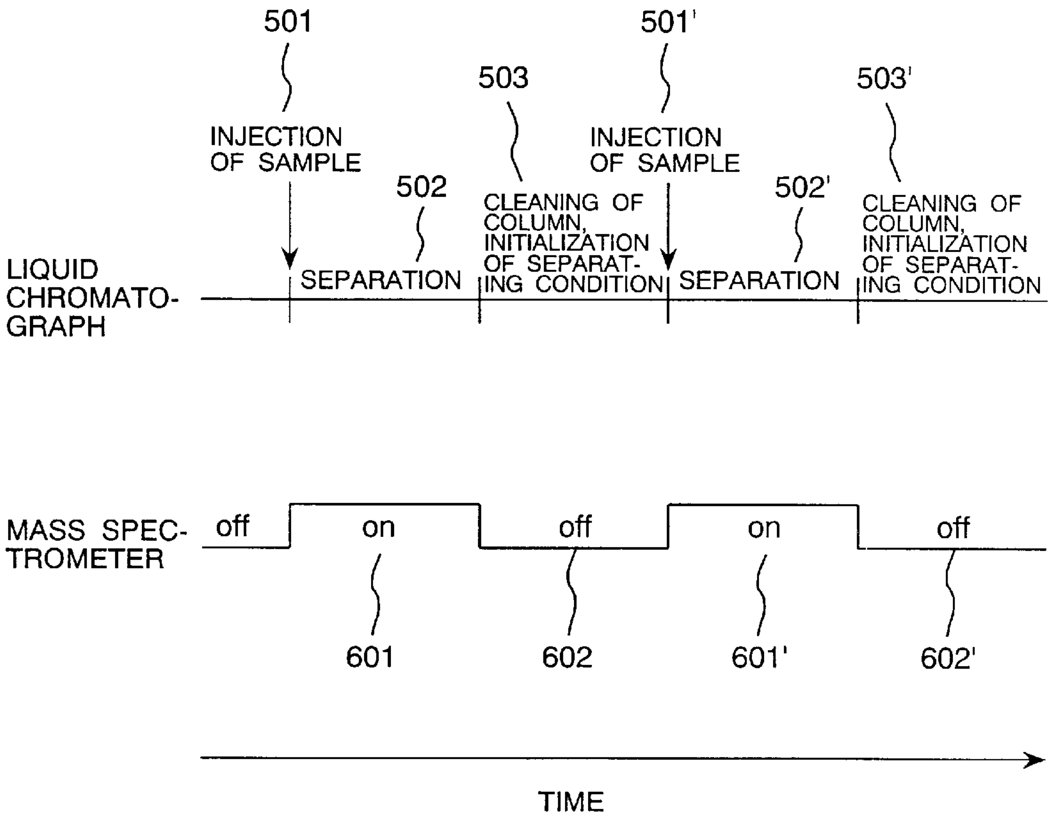
FIG. 10 is a diagram showing a change in control of each of a liquid chromatograph and a mass spectrometer with an elapsed time upon automatic analysis according to one embodiment of the present invention.

The relationship between controls of the liquid chromatograph and mass spectrometer with elapsed time in automatic analysis in accordance with the flow chart shown in FIG. 9 will be more clearly described with respect to FIG. 10. In synchronization with sample injection 501 (corresponding to step 103 in FIG. 9), analysis by the mass spectrometer is started (601). The injected sample is separated (502) by the liquid chromatograph and the components of the sample are sequentially supplied to the mass spectrometer. The time it takes for separation 502 is generally about one hour. Within the time required for the separation 502, the analysis 601 by the mass spectrometer is continued. In the analysis 601, the preliminary analysis 104, determination 105 of the amplitude of the high-frequency voltage in the ion storage period, and analysis 106 are repeated. After an elapse of the time required for analysis of one sample, the analysis by the mass spectrometer is stopped (602), and the separation column is cleaned in the liquid chromatograph (503). In the separation 502 by the liquid chromatograph, there may be often adopted a method of separating the sample by changing the composition of the mobile phase solvent with elapsed time (this method is called "gradient method"). In the case of using the gradient method, the separation condition such as composition of the mobile phase solvent may be initialized into the condition upon start of the separation along with the cleaning of the separation column. After the cleaning of the column (503), the next sample is injected (501'), and the analysis for the sample is performed (601'). By repeating the flow shown in FIG. 10 until the analysis for all of the samples is completed, automatic analysis for a number of samples can be performed.

The embodiments described with reference to FIGS. 1 to 10 are based on the fact that the values of m/z of ions observed cannot be estimated. In some cases, however, values of m/z of ions can be estimated on the basis of the operator's setting. Hereinafter, there -will be described a method of determining the amplitude of the high-frequency voltage applied to the ring electrode in the ion storage period in the case where values of m/z of ions can be estimated from the operator's setting. By previously examining relationships between values of m/z of ions and amplitudes of the high-frequency voltage in the ion storage period capable of efficiently confining the ions in the ion trap mass spectrometric unit and listing them in a control unit or the like, the amplitude can be automatically determined at a value allowing ions estimated on the basis of the operators' setting to be efficiently confined in the ion trap mass spectrometric unit.

The items set by an operator include a scan range which is a range of values of m/z of the mass spectrum intended to be obtained by the operator. If the scan range is set at a range of m/z=100 to 500, it may be considered that the operator aims at analysis of ions having relatively small values of m/z. Meanwhile, if the scan range is set at a range of m/z=1,000 to 2,000, it may be considered that the operator aims at analysis of ions having large values of m/z. Accordingly, the amplitude of the high-frequency voltage in the ion storage period may be determined on the basis of the information of the inputted scan range. In this case, determination of the amplitude may be variously performed. For example, if the scan range is set at a range of m/z=100 to 500, the amplitude capable of efficiently confining an ion having an intermediate value of m/z=300 may be set.

A control software of the mass spectrometer may be provided with a function of inputting information on the names and kinds of substances, and the amplitude of the high-frequency voltage in the ion storage period may be determined on the basis of the inputted information. This is because if the name and kind of a substance are found, the values of m/z of ions created from the substance can be estimated to some extent. For example, icons named "agricultural chemical", "amino acid", "protein", and the like are displayed on a monitor. If an operator selects the icon "agricultural chemical" for analyzing the agricultural chemical, the values of m/z of ions created in the ion source is estimated in a range of about 200 to 300, and therefore, the analytical condition can be set at a value allowing these ions having the values of m/z ranging from 200 to 300 to be detected with high sensitivities. Here, the above analytical condition means the amplitude of the high-frequency voltage in the ion storage period; however, other conditions such as the pressure of an impingement gas introduced in the ion trap mass spectrometric unit or the entrance energy of ions entering in the ion trap mass spectrometric unit may be additionally controlled. This is because the pressure of the impingement gas and the entrance energy of ions exert an effect on the confinement efficiency of the ions into the ion trap mass spectrometric unit, like the amplitude of the high-frequency voltage in the ion storage period.

Figure 11:
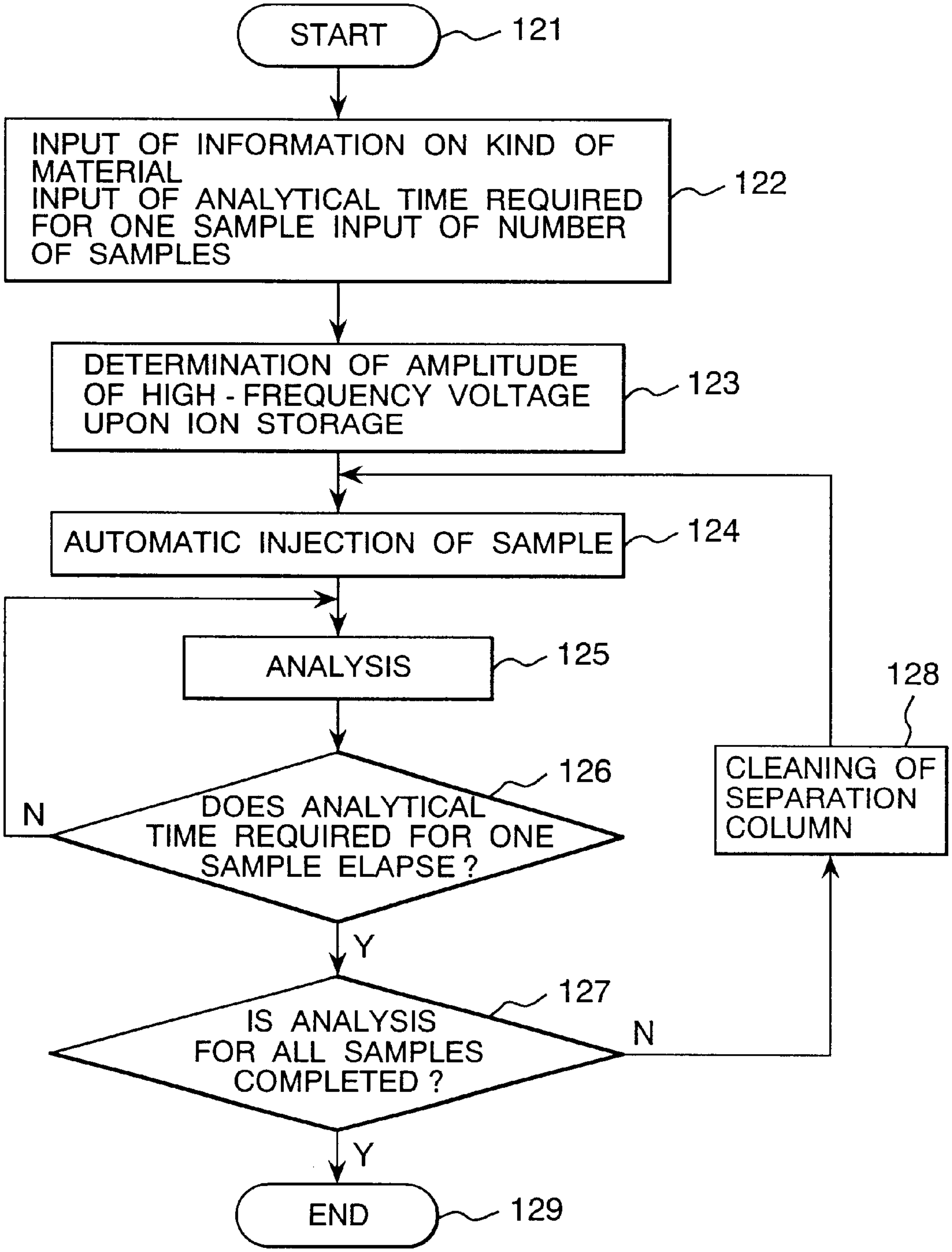
FIG. 11 is a flow chart showing steps of automatic analysis of a substance to be analyzed which can be estimated to some extent according to one embodiment of the present invention.

FIG. 11 is a flow chart showing the flow of treatment in automatic analysis of a sample in the case where values of m/z of ions created from the sample are estimated to some extent. First, information on the number of samples, a time required for analysis of one sample, and kinds of substances is inputted (122). Here, as the information, as described above, the scan range may be inputted or the icon indicating the kind of a substance may be selected. Since the values of m/z of ions created in the ion source can be estimated on the basis of the inputted information, the amplitude of the high-frequency voltage applied to the ring electrode in the ion storage period is set at a value allowing the associated ions to be efficiently confined in the ion trap mass spectrometric unit (123). Then, the sample is automatically injected (124), and the analytical data are obtained (125). After an elapse of the time required for analysis of one sample (126), if a portion, not analyzed, of the sample remains (127), the separation column is cleaned (128), and the next sample is analyzed. The method shown in FIG. 11 is effective for analysis of, for example, agricultural chemical remaining in service water by the water quality inspection organization. Since the object to be analyzed is limited to the agricultural chemical, the values of m/z of ions to be created can be estimated. Accordingly, by determining the amplitude of the high-frequency voltage applied to the ring electrode in the ion storage period prior to sample injection, a number of samples taken in various locations can be automatically analyzed.

The present invention is similarly effective even in the case using a separating means other than the liquid chromatograph, for example, in the case where a capillary electrophoresis or supercritical fluid chromatograph is coupled with the mass spectrometer having the ion trap mass spectrometric unit.

Figure 12:
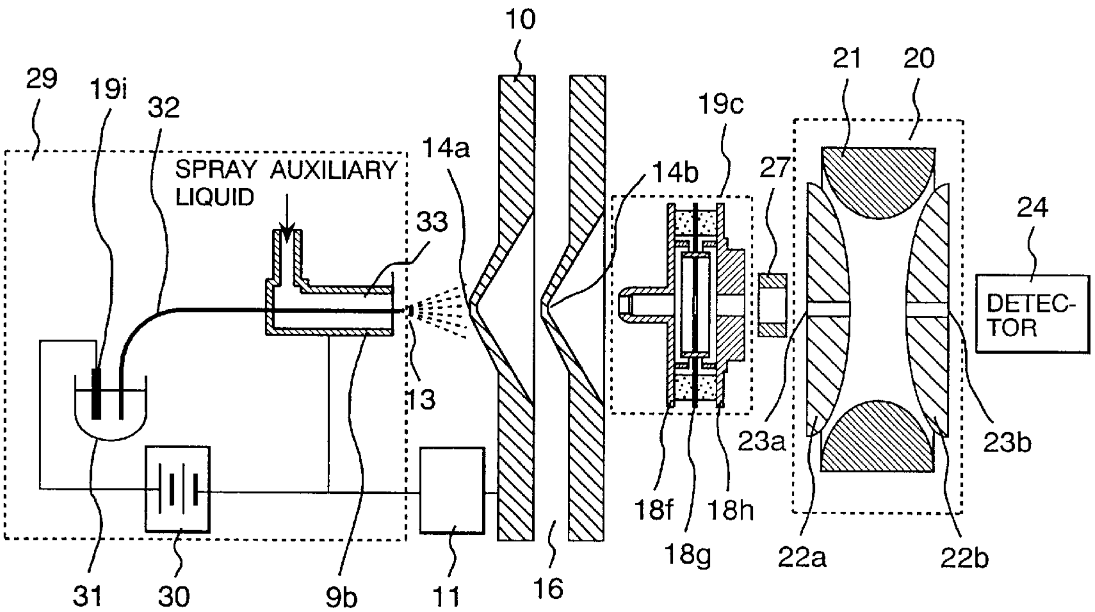
FIG. 12 is a view showing the configuration of one embodiment of a capillary electrophoresis/mass spectrometer of the present invention.
Figure 13:
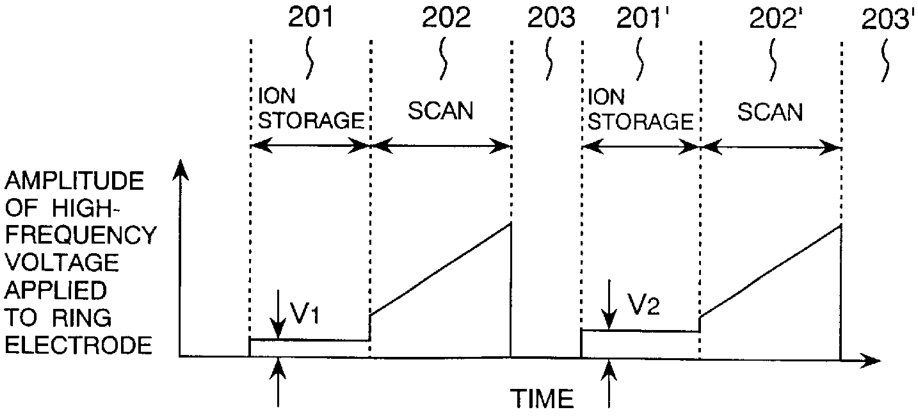
FIG. 13 is a diagram showing a scan function in one embodiment of the present invention.
Figure 14:
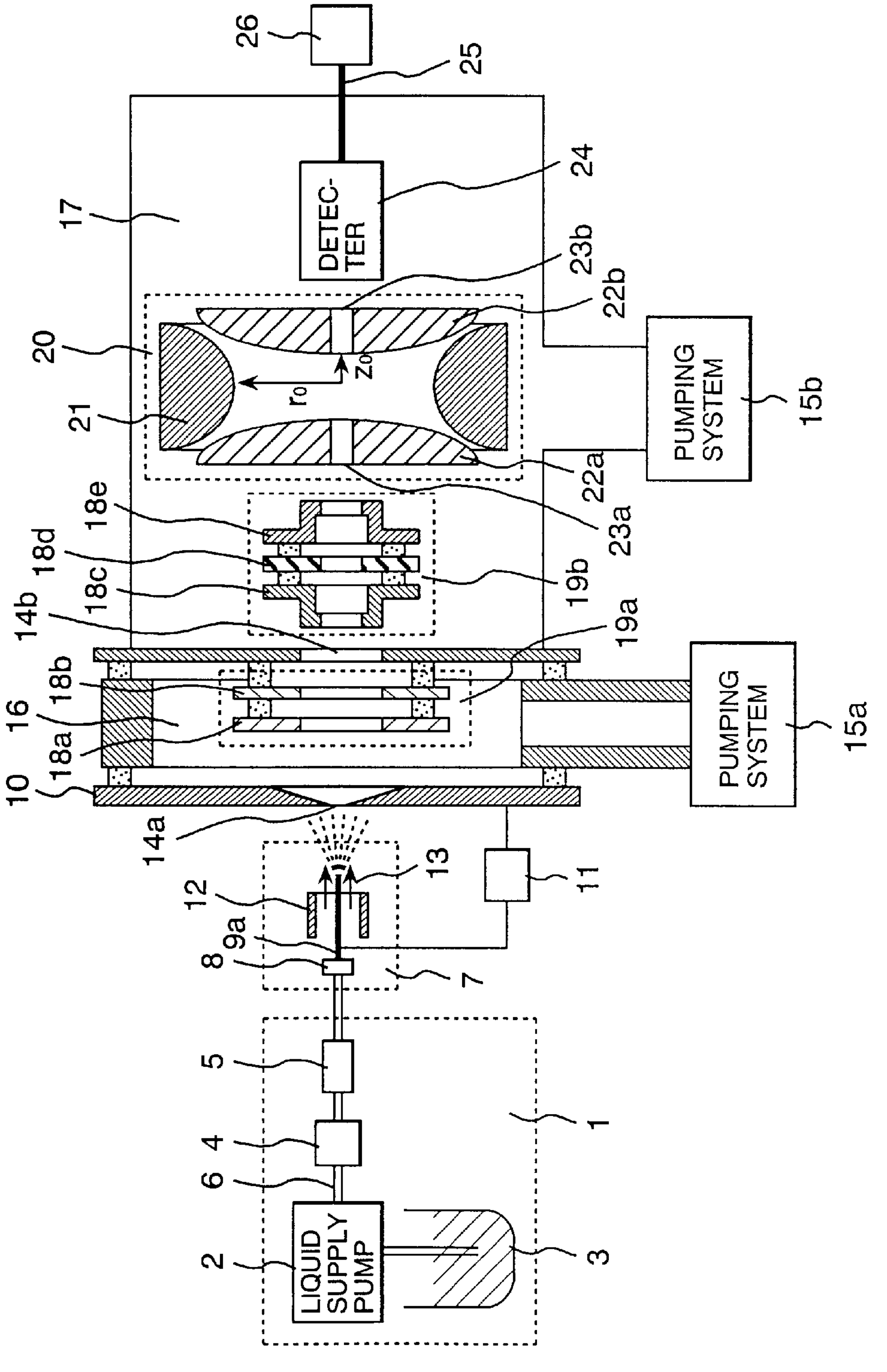
FIG. 14 is a view showing the configuration of a liquid chromatograph/mass spectrometer having a prior art ion trap mass spectrometric unit.
Figure 15:
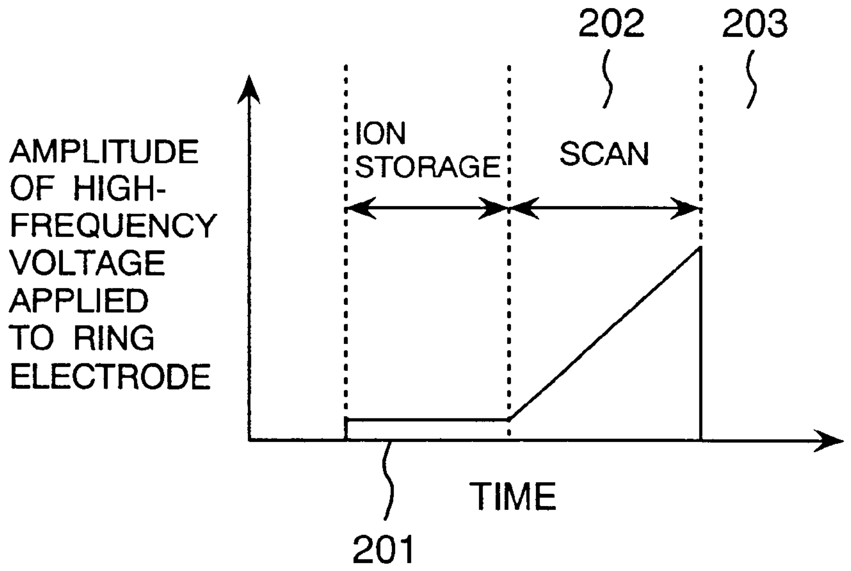
FIG. 15 is a diagram showing a scan function used for the prior art liquid chromatograph/mass spectrometer.
Figure 16:
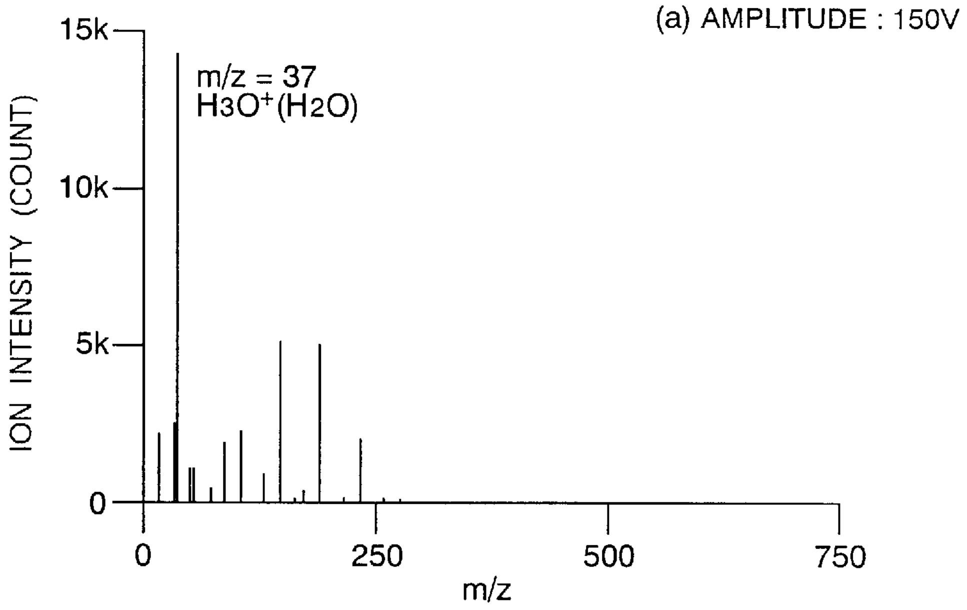
FIG. 16 is a diagram showing a mass spectrum obtained by the prior art liquid chromatograph/mass spectrometer.
Figure 16:
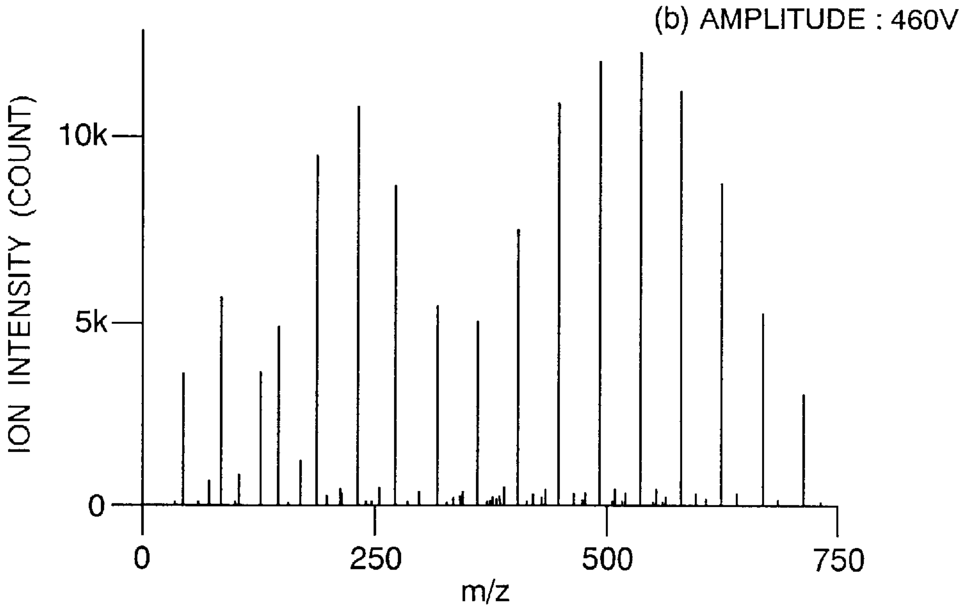
Figure 17:
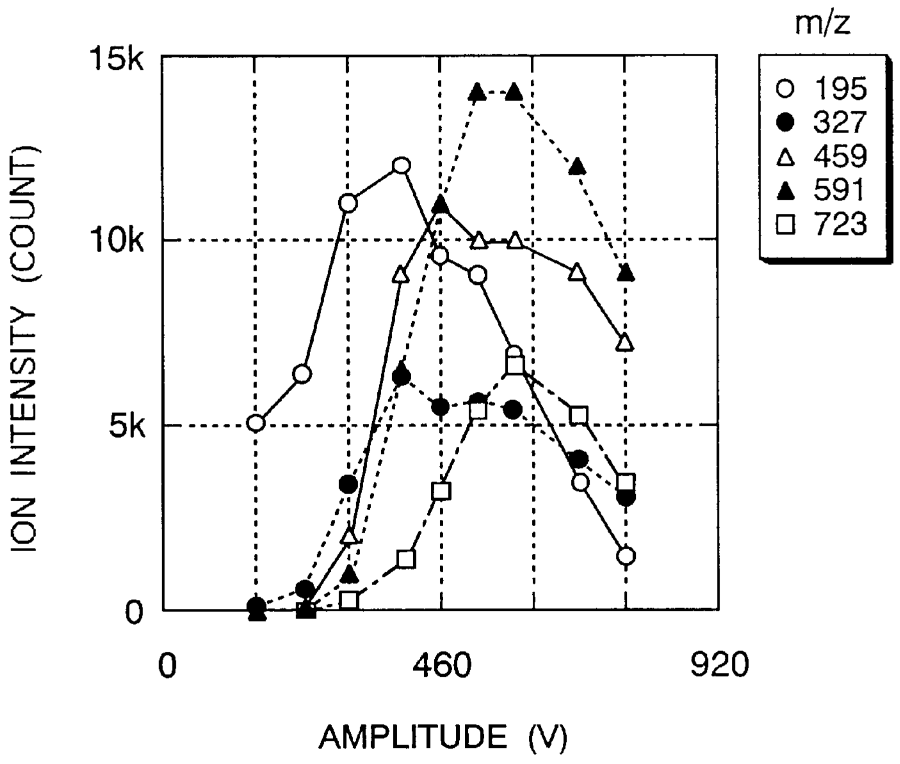
FIG. 17 is a diagram showing a relationship between the amplitude of a high-frequency voltage applied to a ring electrode in an ion storage period and an ion intensity, obtained using the prior art liquid chromatograph/mass spectrometer.

FIG. 12 is a view showing an embodiment in which the present invention is applied to the CE/MS. A capillary electrophoresis unit 29 includes a high voltage power source 30 for electrophoresis, a buffer solution bath 31, and a fused silica made capillary 32. The capillary is filled with the buffer solution. A sample solution in an amount of several nanoliters is introduced into an end, on the anode electrode side, of the capillary by pressurizing or the like. The other end of the capillary is introduced in a metal tube 9*b*. A solution 33 for assisting spraying is introduced between the capillary 32 and the metal tube 9*b*. The terminal of the capillary 32 is in electric-contact with the metal tube 9*b* via the solution 33. A voltage is applied between the metal tube 9*b* and an electrode 19*i* held in the buffer solution bath 31 by the high voltage source 30 for electrophoresis, to thereby apply a high voltage across the capillary 32. The sample introduced in the capillary 32 is moved in the cathode direction by electroendosmosis flow and simultaneously separated by electrophoresis. The sample, which has reached the cathode end of the capillary 32, is mixed with the spray auxiliary solution 33, and electrostatically sprayed with a voltage applied between the metal tube 9*b* and the counter electrode 10 by a power source 11 for spraying. Droplets thus created by spraying are dried to obtain gaseous ions. The gaseous ions are introduced in a vacuum unit via ion introducing pores 14*a* and 14*b* and a differential pumping unit 16. The ions thus introduced in the vacuum unit are converged through a converging lens 19*c* and then introduced in an ion trap mass spectrometric unit 20.

The methods for the LC/MS, described above, are all effective for the CE/MS too. Here, as one example, there will be described a method of changing the amplitude of the high-frequency voltage applied to the ring electrode in each ion storage period. For simplicity, there will be described a case in which the amplitude of the high-frequency voltage in the ion storage period is changed into two values ($V_1$, $V_2$). Assuming that the amplitude of the high-frequency voltage in the first ion storage period 201 is taken as $V_1$ and the amplitude of the high-frequency voltage in the second ion storage period is taken as $V_2$, and the values $V_1$ and $V_2$ satisfy the relationship of $V_2>V_1$, the mass spectrum obtained in the second scan period 202' is made lower in sensitivity for ions having small values of m/z and is made higher in sensitivity for ions having large values of m/z as compared with the mass spectrum obtained in the first scan period 202. Thereupon, the mass spectra obtained in these two scan periods 202 and 202' are totalized or equalized, and are outputted as one mass spectrum, to thereby detect the ions in a wide range of values of m/z.

What is claimed is:

1. A mass spectrometer comprising:

an ion source for ionizing a sample;

an ion introducing pore for introducing ions created in the ion source into a vacuum unit; and an ion trap mass spectrometric unit disposed in the vacuum unit;

wherein the inside of the ion trap mass spectrometric unit has the setting of ion storage periods in each of which ions introduced into the vacuum unit are stored in the ion trap mass spectrometric unit, and mass scan periods in each of which the ions stored in the ion trap mass spectrometric unit are discharged outside the ion trap mass spectrometric unit depending on values of the ions, each value being obtained by dividing the molecular weight of the ion by the valence number of the ion, and the mass spectrum of the ions thus discharged is detected; and wherein the amplitude of a high-frequency voltage applied to a ring electrode constituting part of the ion trap mass spectrometric unit in each of the ion storage periods is set at different values before and after an arbitrary one of the mass scan periods.

2. A mass spectrometer comprising:

an ion source for ionizing a sample;

an ion introducing pore for introducing ions created in the ion source into a vacuum unit; and an ion trap mass spectrometric unit disposed in the vacuum unit;

wherein the inside of the ion trap mass spectrometric unit has the setting of ion storage periods in each of which ions introduced into the vacuum unit are stored in the ion trap mass spectrometric unit, and mass scan periods in each of which the ions stored in the ion trap mass spectrometric unit are discharged outside the ion trap mass spectrometric unit depending on values of the ions, each value being obtained by dividing the molecular weight of the ion by the valence number of the ion, and the mass spectrum of the ions thus discharged is detected; and wherein the amplitude of a high-frequency voltage applied to a ring electrode constituting part of the ion trap mass spectrometric unit in each of the ion storage periods is set based on information obtained by a mass spectrum which has been previously obtained at an arbitrarily set amplitude.

3. A mass spectrometer comprising:

an ion source for ionizing a sample;

an ion introducing pore for introducing ions created in the ion source into a vacuum unit;

an ion trap mass spectrometric unit disposed in the vacuum unit; and a control unit for controlling the mass spectrometer;

wherein the inside of the ion trap mass spectrometric unit has the setting of ion storage periods in each of which ions introduced into the vacuum unit are stored in the ion trap mass spectrometric unit, and mass scan periods in each of which the ions stored in the ion trap mass spectrometric unit are discharged outside the ion trap mass spectrometric unit depending on values of the ions, each value being obtained by dividing the molecular weight of the ion by the valence number of the ion, and the mass spectrum of the ions thus discharged is detected; and wherein the amplitude of a high-frequency voltage applied to a ring electrode constituting part of the ion trap mass spectrometric unit in each of the ion storage periods is automatically determined by the control unit.

4. A mass spectrometer comprising:

an ion source for ionizing a sample;

an ion introducing pore for introducing ions created in the ion source into a vacuum unit;

an ion trap mass spectrometric unit disposed in the vacuum unit;

an input unit for inputting a name of a substance to be analyzed or a kind of a substance to be analyzed; and a control unit for controlling the mass spectrometer;

wherein the inside of the ion trap mass spectrometric unit has the setting of ion storage periods in each of which ions introduced into the vacuum unit are stored in the ion trap mass spectrometric unit, and mass scan periods in each of which the ions stored in the ion trap mass spectrometric unit are discharged outside the ion trap mass spectrometric unit depending on values of the ions, each value being obtained by dividing the molecular weight of the ion by the valence number of the ion, and the mass spectrum of the ions thus discharged is detected; and wherein an analyzing condition of the ion trap mass spectrometric unit is decided based on (1) the inputted name of a substance to be analyzed or the inputted kind of a substance to be analyzed and (2) information stored in the control unit.

5. A mass spectrometer according to claim 4, wherein the analyzing condition of the ion trap mass spectrometric unit decided by the control unit is at least one of an amplitude of a high-frequency voltage applied to a ring electrode constituting part of the ion trap mass spectrometric unit in each of the ion storage periods, a pressure of a gas introduced into the ion trap mass spectrometric unit, and an entrance energy of ions entering the ion trap mass spectrometric unit.

* * * * *